United States Patent
Kenly et al.

(10) Patent No.: US 8,253,402 B2
(45) Date of Patent: Aug. 28, 2012

(54) METHODS AND SYSTEMS FOR COMPONENT VALUE ESTIMATION IN POWER SUPPLIES/CONVERTERS

(75) Inventors: Stewart Kenly, Epping, NH (US); Paul W. Latham, II, Lee, NH (US)

(73) Assignee: L&L Engineering, LLC, Lee, NH (US)

( * ) Notice: Subject to any disclaimer, the term of this patent is extended or adjusted under 35 U.S.C. 154(b) by 379 days.

(21) Appl. No.: 12/622,500

(22) Filed: Nov. 20, 2009

(65) Prior Publication Data

US 2010/0127682 A1 May 27, 2010

Related U.S. Application Data

(60) Provisional application No. 61/116,918, filed on Nov. 21, 2008.

(51) Int. Cl.
*G05F 1/44* (2006.01)
(52) U.S. Cl. ........................................ 323/282
(58) Field of Classification Search .......... 323/282–285, 323/299, 351
See application file for complete search history.

(56) References Cited

U.S. PATENT DOCUMENTS

| | | | |
|---|---|---|---|
| 6,229,292 B1 * | 5/2001 | Redl et al. | 323/285 |
| 6,249,447 B1 | 6/2001 | Boylan et al. | |
| 6,979,987 B2 | 12/2005 | Kernahan et al. | |
| 7,521,907 B2 | 4/2009 | Cervera et al. | |
| 7,528,590 B2 | 5/2009 | Wei | |
| 7,531,997 B2 * | 5/2009 | Mariani et al. | 323/284 |
| 7,545,130 B2 | 6/2009 | Latham | |
| 7,548,047 B1 | 6/2009 | Dasgupta et al. | |
| 7,548,048 B2 | 6/2009 | Chang | |
| 7,558,084 B2 | 7/2009 | Jang | |
| 7,592,789 B2 | 9/2009 | Jain | |
| 7,595,613 B2 | 9/2009 | Thompson et al. | |
| 7,595,686 B2 | 9/2009 | Maksimovic et al. | |
| 7,612,545 B2 * | 11/2009 | Umemoto et al. | 323/271 |
| 7,772,811 B1 * | 8/2010 | Jain et al. | 323/224 |
| 7,902,800 B2 * | 3/2011 | Jain et al. | 323/224 |
| 7,986,134 B2 * | 7/2011 | Chien et al. | 323/284 |
| 8,013,580 B2 * | 9/2011 | Cervera et al. | 323/268 |
| 8,018,210 B2 * | 9/2011 | Chen et al. | 323/224 |
| 8,093,878 B2 * | 1/2012 | Goto et al. | 323/285 |
| 2007/0210777 A1 | 9/2007 | Cervera et al. | |
| 2007/0236200 A1 | 10/2007 | Canfield et al. | |
| 2009/0212751 A1 | 8/2009 | Cervera et al. | |

OTHER PUBLICATIONS

Shirazi, M. et al. Integration of Frequency Response Measurement Capabilities in Digital Controllers for DC-DC Converters, IEEE Transactions on Power Electronics 23(5), Sep. 2008, 2524-2535.

Morroni, J. et al. Design and Implementation of an Adaptive Tuning System Based on Desired Phase Margin for Digitally Controlled DC-DC Converters, IEEE Transactions on Power Electronics 24(2), Feb. 2009, 559-564.

Zhao, Z. et al., ESR Zero Estimation and Auto-compensation in Digitally Controlled Buck Converters, Twenty-Fourth Annual IEEE Applied Power Electronics Conference and Exposition, 2009. APEC 2009. Date: Feb. 15-19, 2009, pp. 247-251.

Buiatti, G.M. et al., An Online Technique for Estimating the Parameters of Passive Components in Non-Isolated DC/DC Converters, IEEE International Symposium on Industrial Electronics, 2007, ISIE 2007, Date: Jun. 4-7, 2007, pp. 606-610.

(Continued)

*Primary Examiner* — Adolf Berhane

(57) ABSTRACT

In one embodiment, the method of these teachings includes decomposing the output ripple voltage into its constituent components and utilizing the scale factor necessary for this decomposition to obtain the measure capacitance and ESR for a power supply/converter.

22 Claims, 11 Drawing Sheets

OTHER PUBLICATIONS

Buiatti, G.M. et al., ESR Estimation Method for DC/DC Converters Through Simplified Regression Models, 42nd IAS Annual Meeting. Conference Record of the Industry Applications Conference, 2007, Date: Sep. 23-27, 2007, pp. 2289-2294.

Buiatti, G.M. et al., Parameter Estimation of a DC/DC Buck converter using a continuous time model, 2007 European Conference on Power Electronics and Applications, Date: Sep. 2-5, 2007, pp. 1-8.

International Search Report and Written Opinion dated Jan. 26, 2010 for PCT/US09/65278.

* cited by examiner

METHODS AND SYSTEMS FOR COMPONENT VALUE ESTIMATION IN POWER SUPPLIES/CONVERTERS

CROSS REFERENCE TO RELATED APPLICATIONS

The present application claims priority to U.S. Provisional Application No. 61/116,918 filed Nov. 21, 2008 entitled METHODS AND SYSTEMS FOR COMPONENT VALUE ESTIMATION IN POWER SUPPLIES/CONVERTERS which is incorporated herein in its entirety by reference.

BACKGROUND

These teachings relate generally to component value estimation in power supplies/converters.

In the field of DC to DC converters and power supplies in general, in order to achieve optimum transient performance, it is necessary to know the power components values of the power supply. In a typical power supply application, a load capacitance may not be well known since the power supply is expected to work with a variety of loads. Physical load capacitance has an equivalent series resistance (ESR) and equivalent series inductance (ESL) in addition to capacitance. For many cases the equivalent series inductance may be insignificant. However, the equivalent series resistance may not be insignificant. The effect of the series resistance is to create high-frequency zero and transfer function between duty cycle and output voltage. The capacitance ESR has a well known effect on closed loop stability and must be accounted for.

To measure the properties of any network a signal may be injected. Adaptive methods can inject a known duty cycle waveform and measure its response on the output voltage. These methods have the limitation that the injected signal can cause a deviation of the output, which can defeat the purpose of a power supply, i.e. to eliminate these variations. Thus, what is needed is a measurement method that does not require an injected signal.

SUMMARY

The problems set forth above as well as further and other problems are solved by the present teachings. These solutions and other advantages are achieved by the various embodiments of the teachings described herein below.

In one embodiment, the method of these teachings includes decomposing the output ripple voltage into its constituent components and utilizing the scale factor necessary for this decomposition to measure capacitance and ESR for a power supply. In one instance, correlation is utilized to obtain the scale factors. In another instance, the LMS algorithm is utilized to obtain the scale factors. In yet another instance, the sampled voltage output waveform is utilized to obtain the scale factors.

The method for estimating, by correlation, at least one system parameter for a power supply/converter having a driver component receiving a duty cycle command can include, but is not limited to including, the steps of decomposing a ripple voltage associated with the power supply/converter into constituents, determining at least two basis functions for the power supply/converter based on a nominal network, the at least two basis functions including values, computing at least one scale factor by correlating the constituents to the values, and estimating the system parameter based on the scale factor. The method for estimating, by LMS algorithm, a system parameter for a power supply/converter can include, but is not limited to including, the steps of decomposing a ripple voltage into constituents, summing an ideal capacitor voltage basis function and an ESR voltage basis function for the power supply/converter based on a nominal network, scaling the sum, computing a scale factor by applying a least mean squares (LMS) algorithm to an output voltage of the power supply/converter and the scaled sum, and estimating the system parameter based on the scale factor. The method for estimating, by sampling, a system parameter for a power supply/converter can include, but is not limited to including, the steps of determining an ideal capacitor basis function and an ESR basis function for the power supply/converter based on a nominal network, sampling an output waveform from the power supply/converter to determine minima and maxima of a capacitor voltage and an ESR voltage, comparing the minima and maxima to the ideal capacitor basis function and the ESR basis function, determining a scale factor based on the step of comparing, and estimating the system parameter based on the scale factor.

A power supply/converter according to the present teachings can include, but is not limited to including, a circuit providing an output voltage. The circuit can include a ripple voltage, and the ripple voltage can have constituents. The power supply/converter can also include a switching component that can be operatively connected to switch the circuit between switching states. The power supply/converter can also include a driver component that can be operatively connected to drive the switching component in order to cause switching between switching states. The driver component can have a period. The power supply/converter can also include a compensator component that can be operatively connected to receive an input control signal and estimates of a system parameter for the power supply/converter, and can be operatively connected to provide a duty cycle command based on the input control signal and the estimates to the driver component. The power supply/converter can also include a basis function generator that can provide basis functions for the power supply/converter based on a nominal network for the power supply/converter. The basis functions can include values. The power supply/converter can also include a correlator that can correlate the values with the constituents to compute a scale factor. The power supply/converter can also include an estimator that can provide estimates to the compensator based on the scale factor.

In the present embodiment, the AC component of the output voltage is decomposed into two orthogonal basis functions—the voltage across the capacitor and the voltage across the capacitor's resistance—which are orthogonal by their nature. The transfer function between the output voltage and the switch voltage can be related to the parameter values and the transform of each of these bases functions. Then, from the decomposition of the AC component of the output voltage, the capacitance and the resistance of the capacitor can be estimated. There are several ways of obtaining that decomposition, which are disclosed as various embodiments of systems and methods. Embodiments of power converters (power supplies) that utilize the systems of these teachings are also disclosed. In one embodiment, the method of these teachings utilizes the pulse width modulator (PWM) signal itself as the stimulus to the power supply network and uses the high-frequency signature as a method of measurement.

For a better understanding of the present teachings, together with other and further needs thereof, reference is made to the accompanying drawings and detailed description.

BRIEF DESCRIPTION OF THE DRAWINGS

FIG. 2 is a graph of steady state waveforms present in the PWM buck power supply shown in FIG. 1a;

DETAILED DESCRIPTION

An exemplary embodiment, using a buck converter topology, is described below in order to better illustrate the system of these teachings.

Figure 1A:
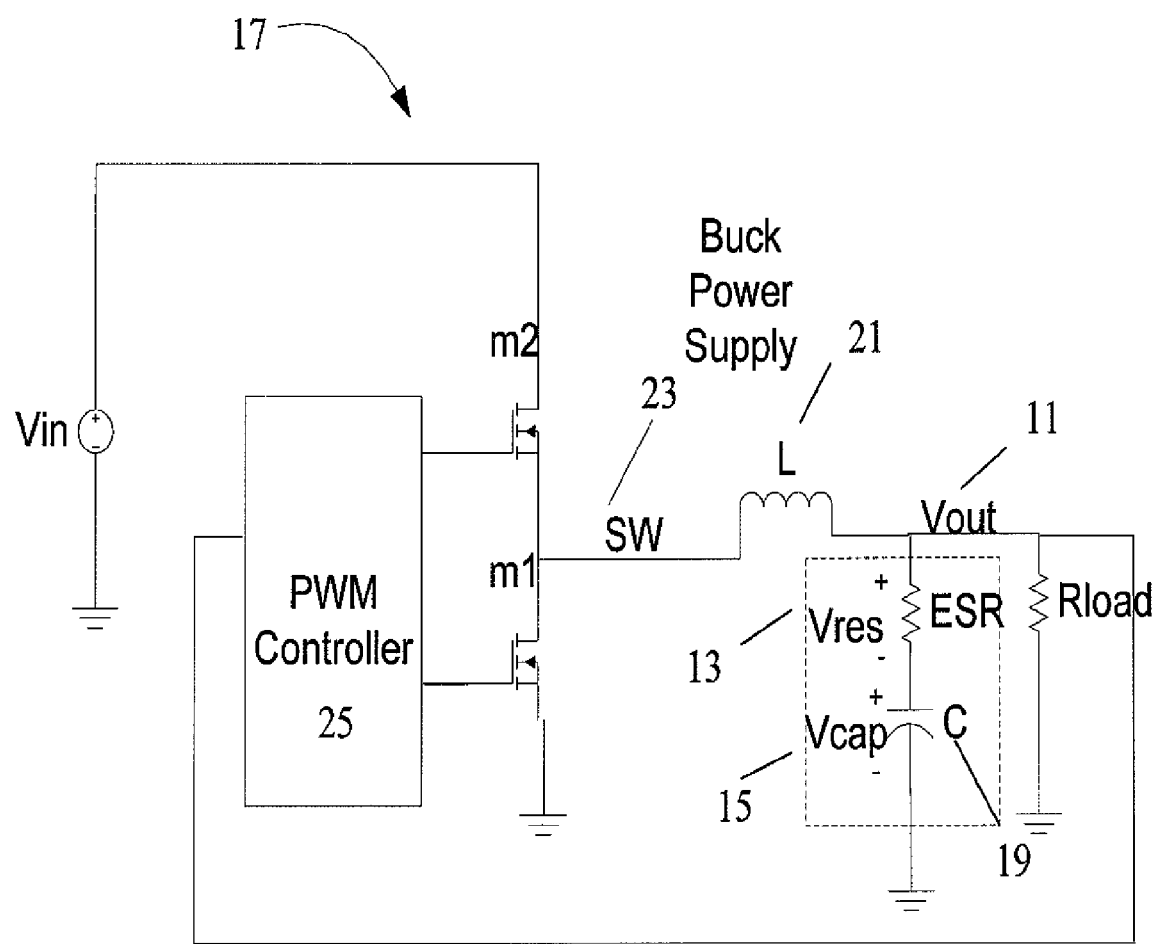
FIG. 1a is a schematic diagram of a typical PWM buck power supply.

FIG. 1a shows a diagram of a PWM Buck power supply 17. Output voltage 11 shown in FIG. 1a has two components: the voltage across the equivalent series resistance (ESR), Vres 13 and the voltage across the ideal, ESR free, output capacitor 19, Vcap 15. For power supply 17, the components are chosen so that the output voltage ripple is small. As a result inductor current 21 has a triangular characteristic that is filtered by output capacitor 19.

Figure 1B:
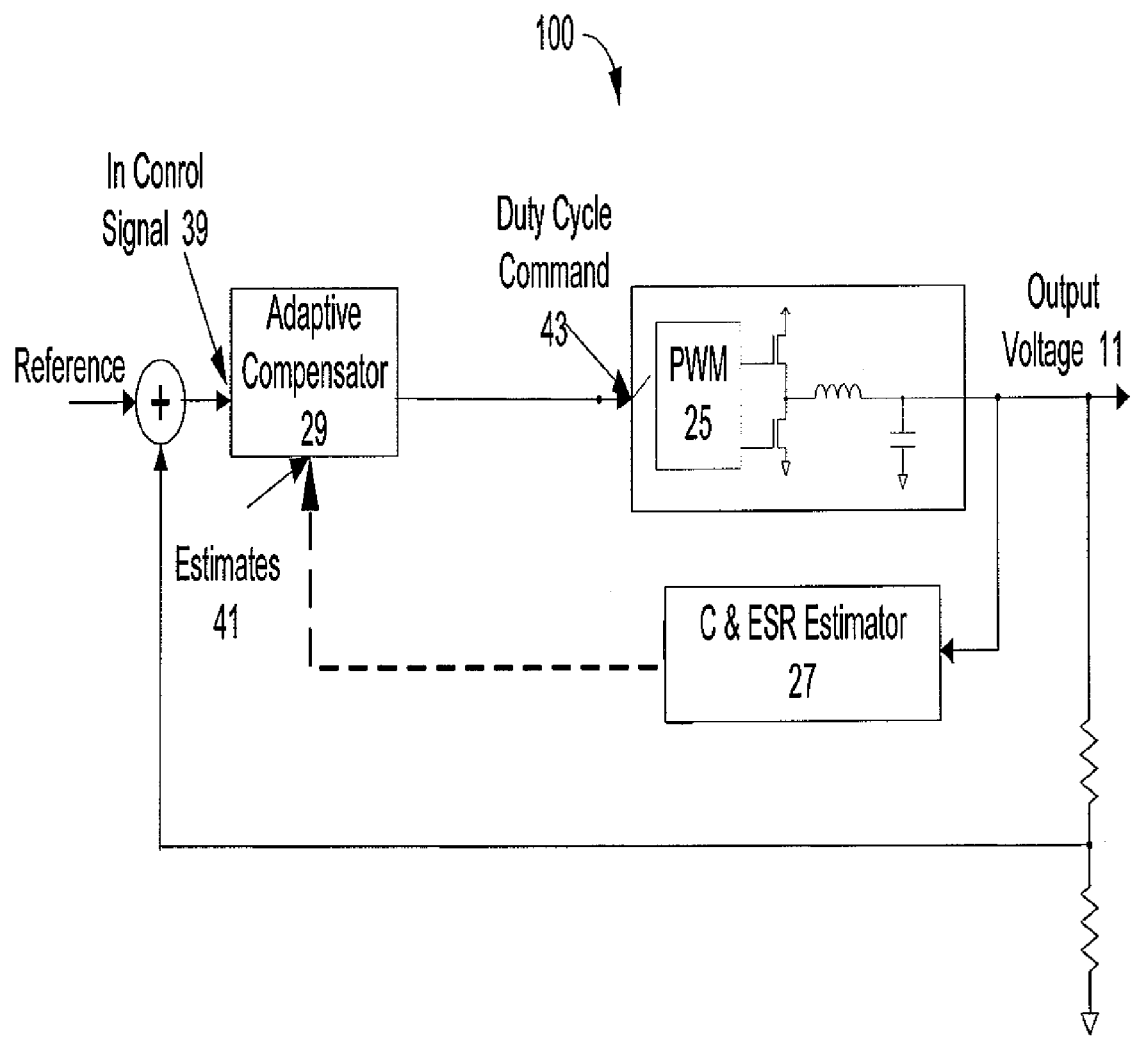
FIG. 1b is a schematic diagram of a power converter of the present teachings.

The transfer function for the power stage is approximately:

$$\frac{vout(s)}{sw(s)} = \frac{RcapCs + 1}{LCs^2 + (Rind + Rcap)Cs + 1}$$

where: Rcap is the output capacitor ESR, C is the output capacitance, L is the inductance, Rind is the ESR of the inductor, Vout is the output voltage 11, and SW is the switch voltage 23. Referring now to FIG. 1b, the output of a power supply and the AC coupled switch waveform (not shown) are provided to C & ESR estimator subsystem 27 implementing embodiments of the methods of the present teachings. C & ESR estimator subsystem 27 results are provided to adaptive compensator 29 (such as, but not limited to, the adaptive compensators described in U.S. Patent Application #2007/0112443, which is incorporated by reference herein in its entirety). C & ESR estimator subsystem 27 may be implemented by a correlator method, an LMS method, or a sampling method disclosed herein below. Power supply/converter 100 can include, but is not limited to including, circuit providing an output voltage 11. The circuit can include a ripple voltage, and the ripple voltage can have constituents. Power supply/converter 100 can also include switching component 23. Switching component 23 can be operatively connected to switch the circuit between switching states. Power supply/converter 100 can also include driver component 25 that can be operatively connected to drive switching component 23 in order to cause switching between switching states. Driver component 25 can have a period. Power supply/converter 100 can also include compensator component 27 that can be operatively connected to receive input control signal 39 and estimates 41 of the system parameter associated with power supply/converter 100, and to provide duty cycle command 43 based on input control signal 39 and estimates 41 to driver component 25. Power supply/converter 100 can also include basis function generator 33 providing basis functions for power supply/converter 100 based on a nominal network for power supply/converter 100. The basis functions can include values. Power supply/converter 100 can also include correlator 31 that can correlate the values with the constituents to compute a scale factor, and estimator 27 that can provide estimates 41 to compensator 27 based on the scale factor.

Figure 2:
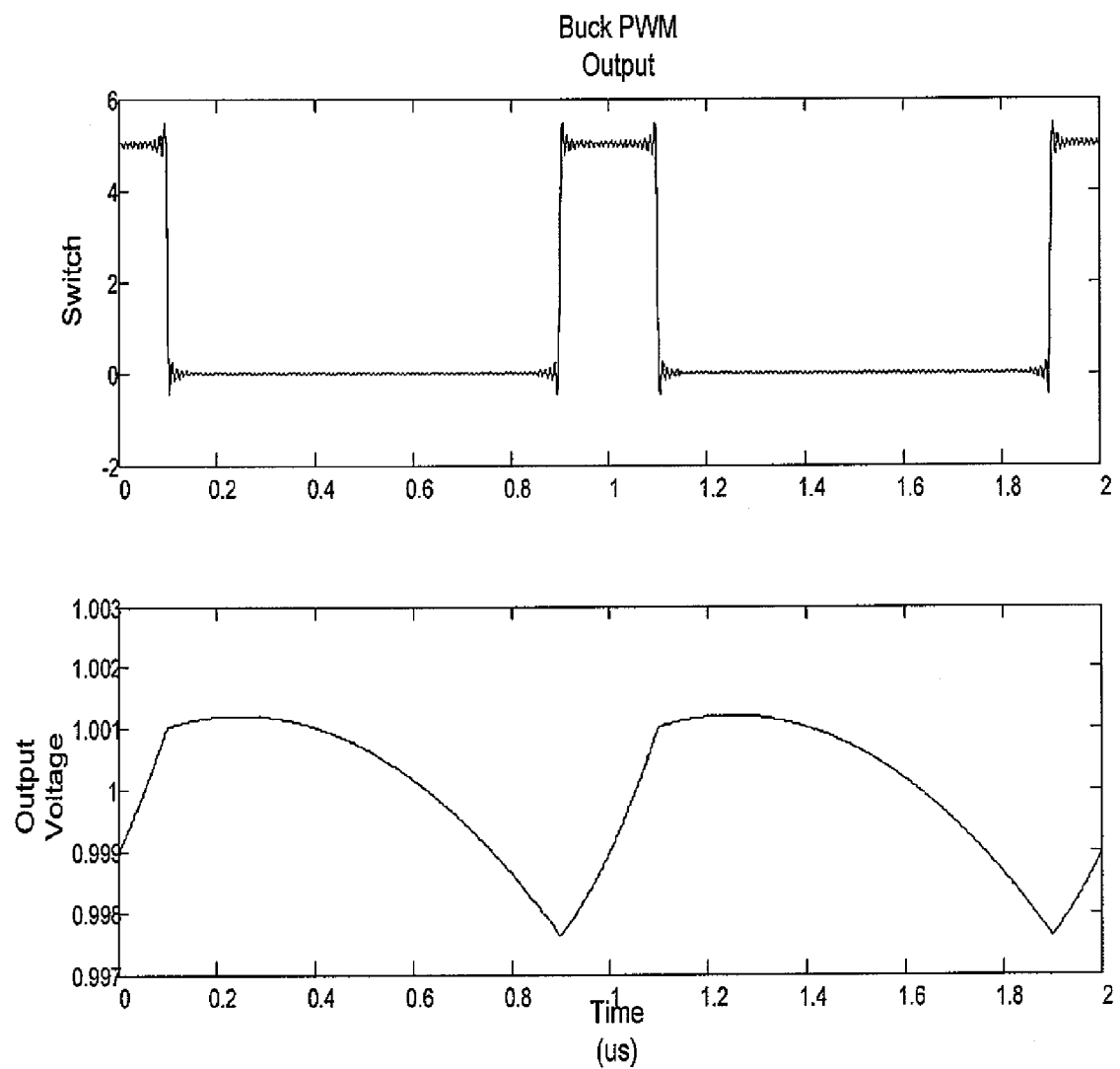

Referring now to FIG. 2, steady state waveforms present in PWM controller 25 (FIG. 1a) are shown. The PWM frequency can be much larger then the filter resonant frequency. As a result, the transfer function can be accurately approximated by:

$$\frac{vout(s)}{sw(s)} \approx \frac{Rcap}{Ls} + \frac{1}{LCs^2} = vres(s) + vcap(s)$$

As seen in the above equation, Vres has the functional form of the derivative of Vcap. This result is due to the equality of the ESR current and the capacitor current which is proportional to the derivative of the capacitor voltage. A further consequence is that Vcap and Vres are mutually orthogonal functions.

The time domain waveforms for the Vres and Vcap functions can be calculated using a Fourier series expansion of the input switch node waveform. Using analytic continuation, Laplace transform approximate expression can be converted to a function of frequency (s=jw). The Fourier series of the AC coupled switch waveform is:

$$sw(t) = \sum_{i=1}^{\infty} \frac{2}{w}\sin\left(\frac{duty}{w}\right)\cos\left(\frac{t + duty/2}{w}\right) + \sum_{k=1}^{\infty} \frac{2}{w}\left(1 - \cos\left(\frac{duty}{w}\right)\right)\sin\left(\frac{t + duty/2}{w}\right)$$

where: w=2πk, t is normalized time from 0 to 1, where 1 normalized to the Tpwm, Tpwm is the PWM period, and duty is the duty cycle of the PWM.

The Fourier series of the AC ideal capacitor waveform is:

$$vcap(t) = \left[\sum_{k=1}^{\infty} \frac{2}{w}\sin\left(\frac{duty}{w}\right)\cos\left(\frac{t + duty/2}{2}\right) + \sum_{k=1}^{\infty} \frac{2}{w}\left(1 - \cos\left(\frac{duty}{w}\right)\right)\sin\left(\frac{t + duty/2}{w}\right)\right] \frac{-Tpwn^2}{LCw^2}$$

The Fourier series of the AC capacitor ESR waveform is:

$$vres(t) = \left[\sum_{k=1}^{\infty} \frac{2}{w}\sin\left(\frac{duty}{w}\right)\cos\left(\frac{t + duty/2}{w}\right) + \sum_{k=1}^{\infty} \frac{2}{w}\left(1 - \cos\left(\frac{duty}{w}\right)\right)\sin\left(\frac{t + duty/2}{w}\right)\right] \frac{-Tpwn}{Lw}$$

Figure 3:
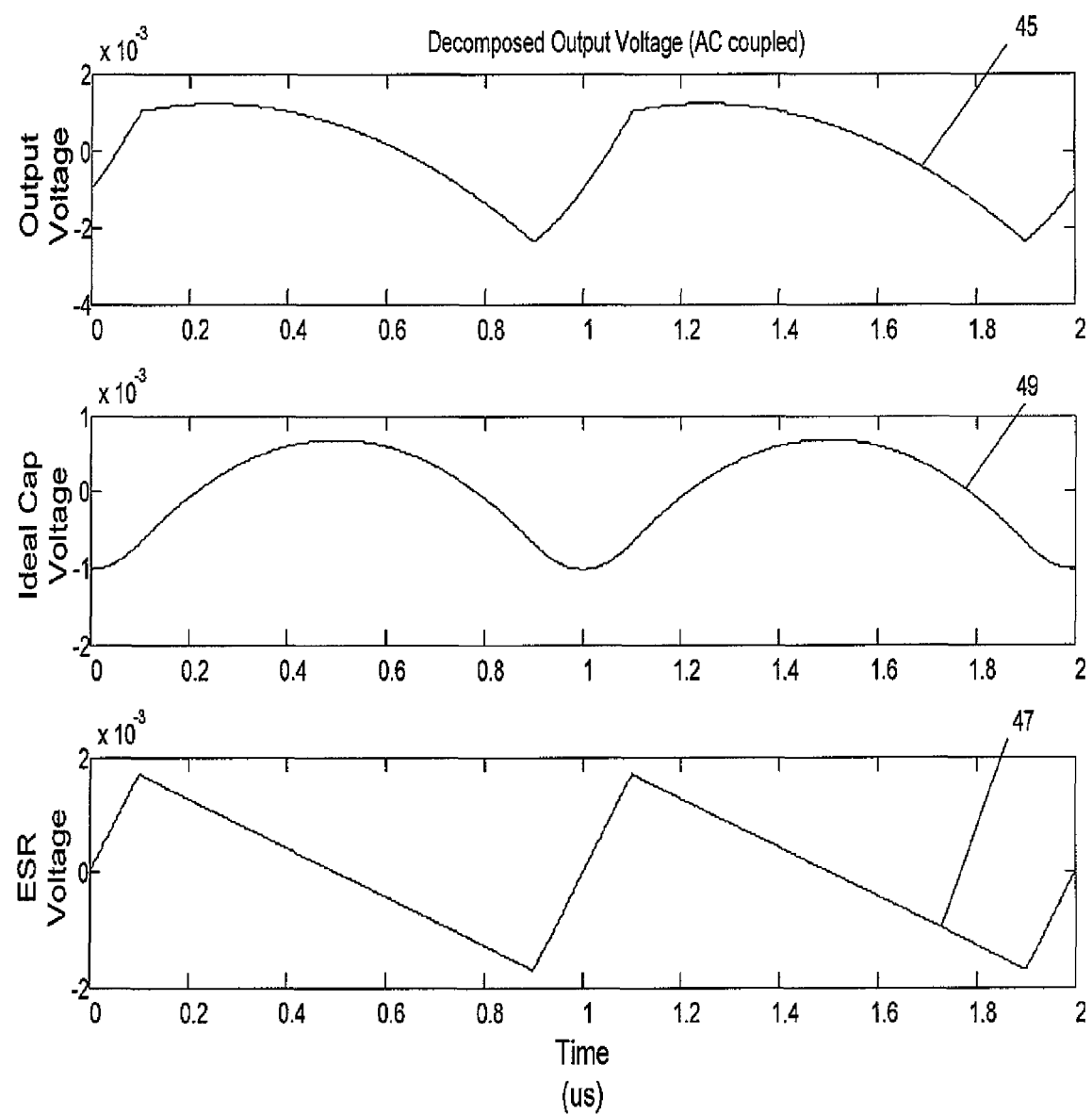
FIG. 3 is a graph of the output ripple decomposed into two components.

Referring now to FIG. 3, a graph of the output ripple decomposed into Vcap and Vres is shown. Output voltage waveform 45 is the sum of the ESR voltage 47 and the ideal capacitor voltage 49. Shown in these examples are the cases where two bases functions are used. In the case where the equivalent series inductance is not insignificant, a third basis function can be added. This basis function is proportional to the original switch waveform. The resulting decomposition of the output ripple is then into three parts: voltage across ESL, voltage across ESR, and voltage across the ideal capacitor.

These teachings include decomposing the output ripple form into its constituent components. The scale factor necessary for this decomposition then allows for measurement of both the capacitance and the ESR. In this embodiment, the inductance, input voltage, and duty cycle are predetermined. By curve fitting the output ripple form into its basis functions, a low noise measurement technique is generated. The output voltage ripple waveform can be projected (correlated) to the ESR voltage and ideal capacitor voltage basis functions. Because of basis function orthogonally, the scale factors for both projections are independent.

An embodiment of the method of these teachings includes generating the bases waveforms based on a nominal network. This embodiment results in a unit sized projection of the nominal output ripple to each of the basis functions. When either or both of the capacitor ESR or capacitor value changes, the size of the projections changes proportionally. The resulting ESR and capacitance can be determined by the magnitude of the projections.

For example:

$$\text{vout}(t) = \text{wvcap vcap}(t) + \text{wvres vres}(t)$$

$$C_{measured} = \text{wvcap} C_{nm}$$

$$ESR_{measured} = \text{wvres } ESR_{nm}$$

where $C_{nm}$, and $ESR_{nm}$ are the nominal values of C and ESR used for generation of the nominal vcap(t) and vres(t), the basis functions used for the LMS projections, wvcap is the scale factor for vcap(t), and wvres is the scale factor for vres(t). Power converter (power supply) system 100 (FIG. 2) utilizing an embodiment of a subsystem implementing the capacitor and ESR estimation methods of these teachings is shown in FIG. 1b. These teachings can be implemented by either analog and digital means or a mixture of two, and by using a sampled representation of the waveforms.

Figure 4:
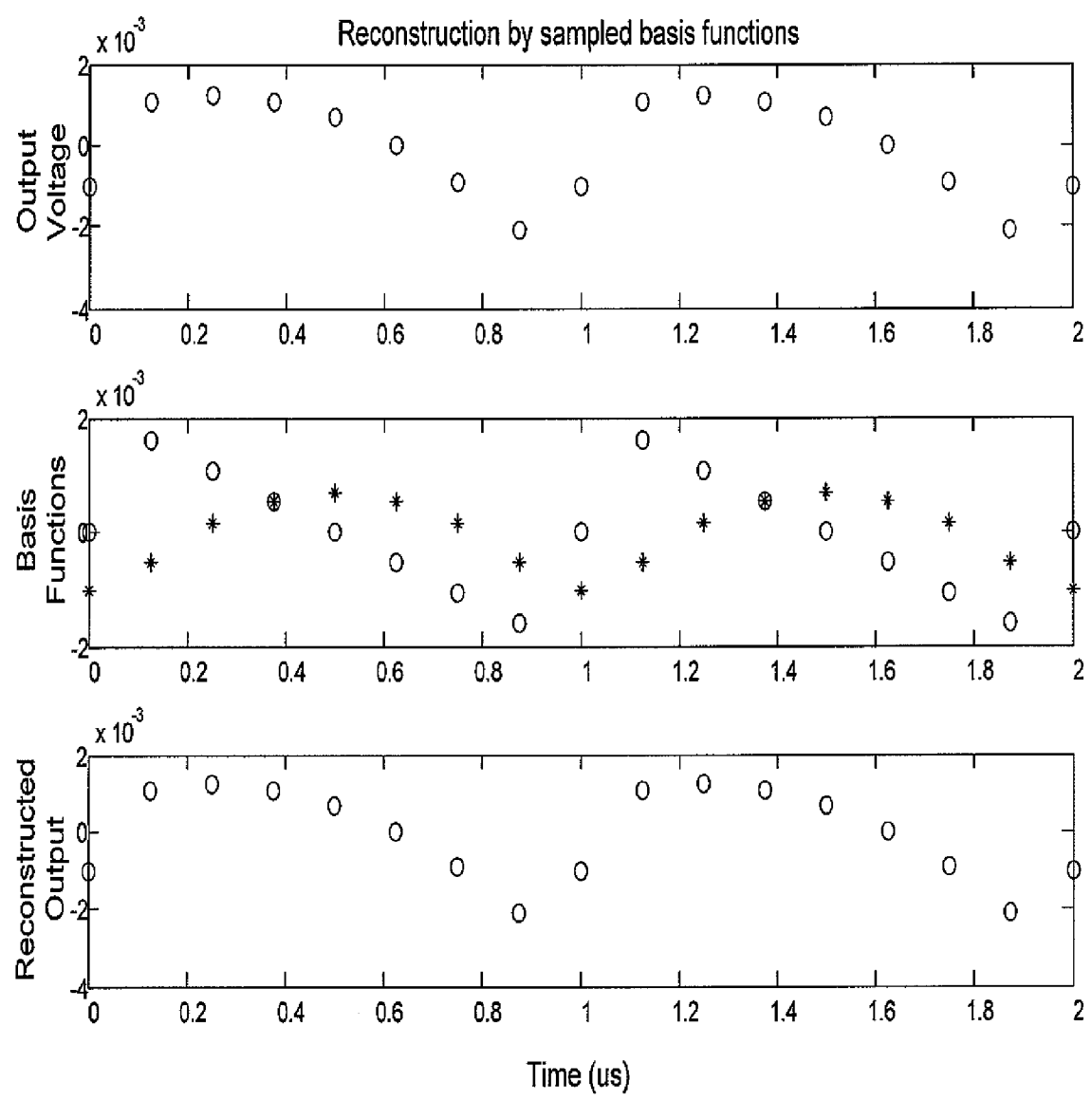
FIG. 4 is a graph of a sampled representation of the waveforms in which the sampling rate is eight times the PWM frequency.

Referring now to FIG. 4, an exemplary sampling rate is eight times the PWM frequency. Experimentally this has been determined to be adequate and lower levels of oversampling are also feasible.

One method to implement these teachings is to use digital or analog correlators that are synchronous to the PWM period. The correlators then directly compute the scale factors. A digital correlator example is:

$$wvcap = \frac{\sum_{j=1}^{N} vout(j)vcap(j)}{\sum_{j=1}^{N} vcap(j)^2}$$

$$wvres = \frac{\sum_{j=1}^{N} vout(j)vres(j)}{\sum_{j=1}^{N} vres(j)^2}$$

Figure 5:
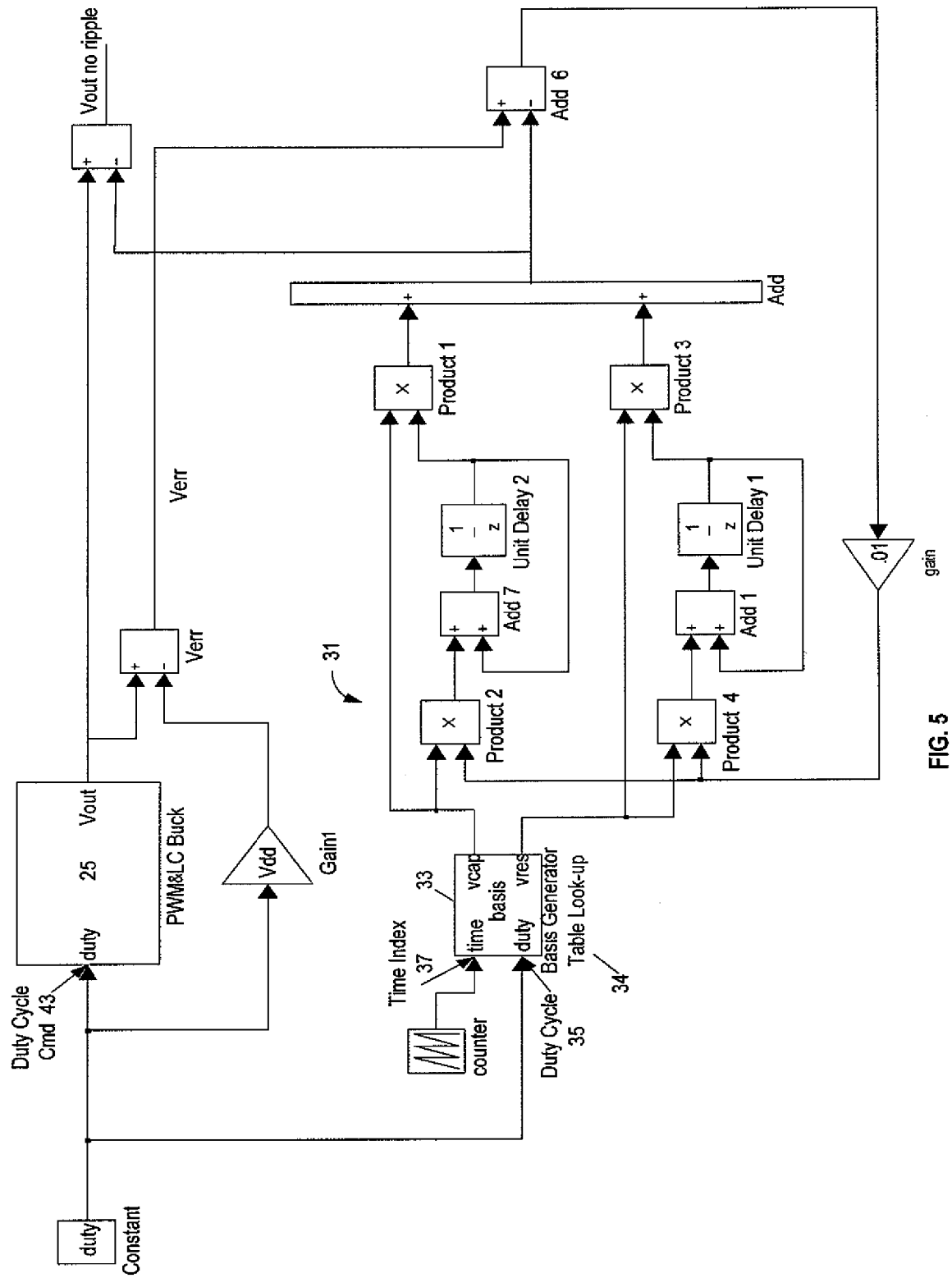
FIG. 5 is a schematic diagram of an LMS algorithm implementation of the present teachings.

Referring now to FIG. 5, a second method to implement these teachings is to use an LMS algorithm. The LMS updates adjust the scale factors such that the error between the output and the scaled sum of the orthogonal bases functions are minimized. An additional result of this method is the ability to predict what the ideal output voltage would be without the PWM ripple. The prediction of the ideal output voltage without the PWM ripple is useful for the output voltage feedback control loop. (The ideal output voltage without the PWM ripple can also be generated by subtracting the scaled basis functions from the output voltage.) Correlator 31 can be a digital correlator or an analog correlator that is synchronous with the period. The basis functions can include an ideal capacitor basis function, an equivalent series resistance (ESR) basis function, and an equivalent series inductance (ESL) basis function. The constituents can include voltage across ESR, voltage across an ideal capacitor, and voltage across ESL. The system parameter can include capacitance and ESR. Basis function generator 34 can include table 33 storing values, and a selection component selecting one of the values based on time index 37 of a signal from driver component 25 and duty cycle 35. Basis function generator 34 can also include a switch waveform associated with power supply/converter 100 (FIG. 1b), and an integrator integrating, two times, the switch waveform with an AC coupling.

Continuing to refer to FIG. 5, one method for generating basis functions is to use, for example, but not limited to, a read only memory (ROM) or other look up table 33 to store the bases function values. One input to lookup table 33 can be time index 37 of the PWM signal. Time index 37 is cyclic and repeats with each PWM cycle. A second input to lookup table 33 can be duty cycle 35.

Figure 6:
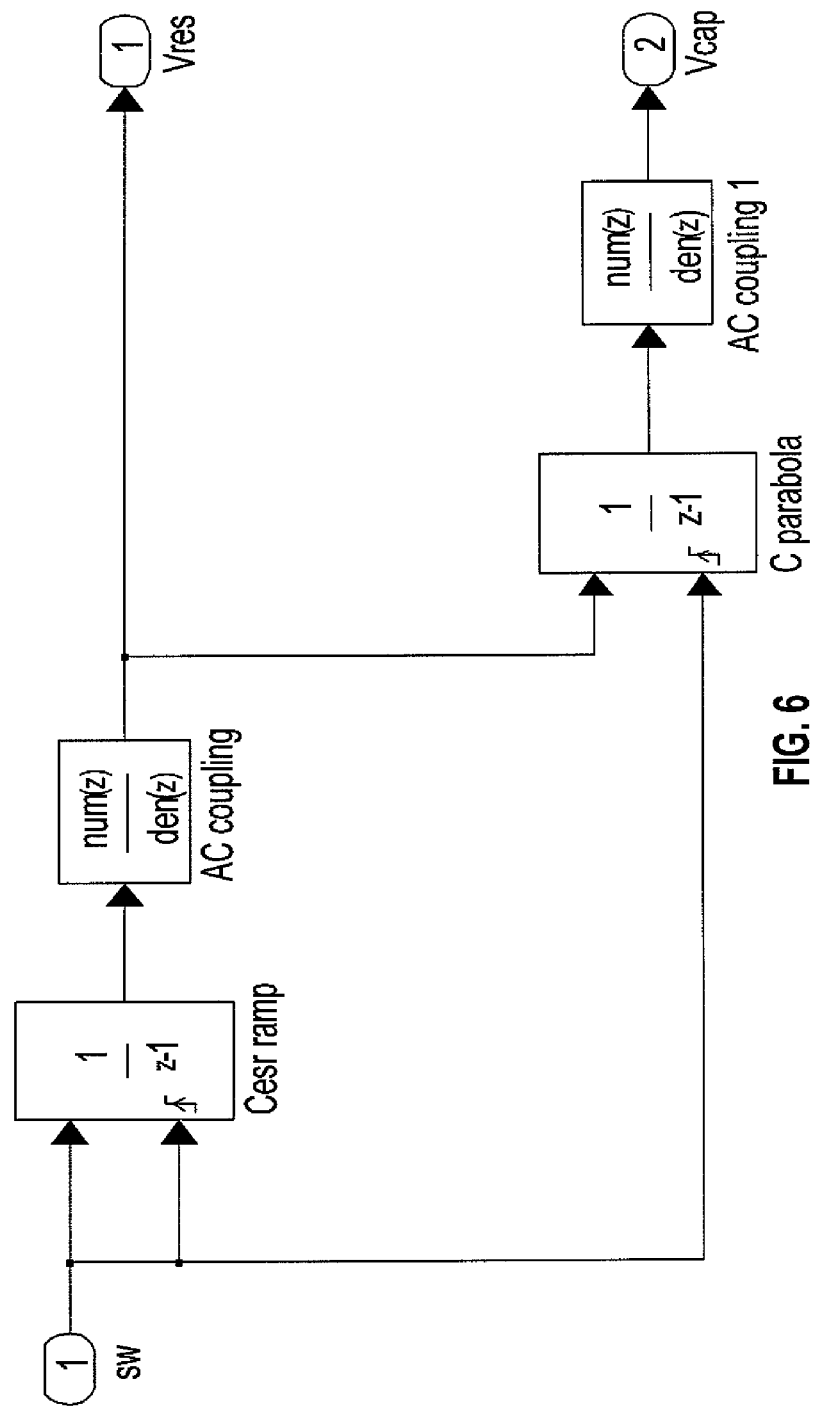
FIG. 6 is a schematic diagram of an exemplary embodiment of a double integrator implementation of the present teachings.

Referring now to FIG. 6, a second method to generate the basis functions is to integrate the switch waveform two times with the appropriate AC coupling. Both integrators can be reset once per PWM cycle. In the basis function generation methods described herein, bases functions can be, for example, but not limited to, multiplied by the input voltage. Also, the final resulting projected weights can be scaled by the input voltage.

Figure 7:
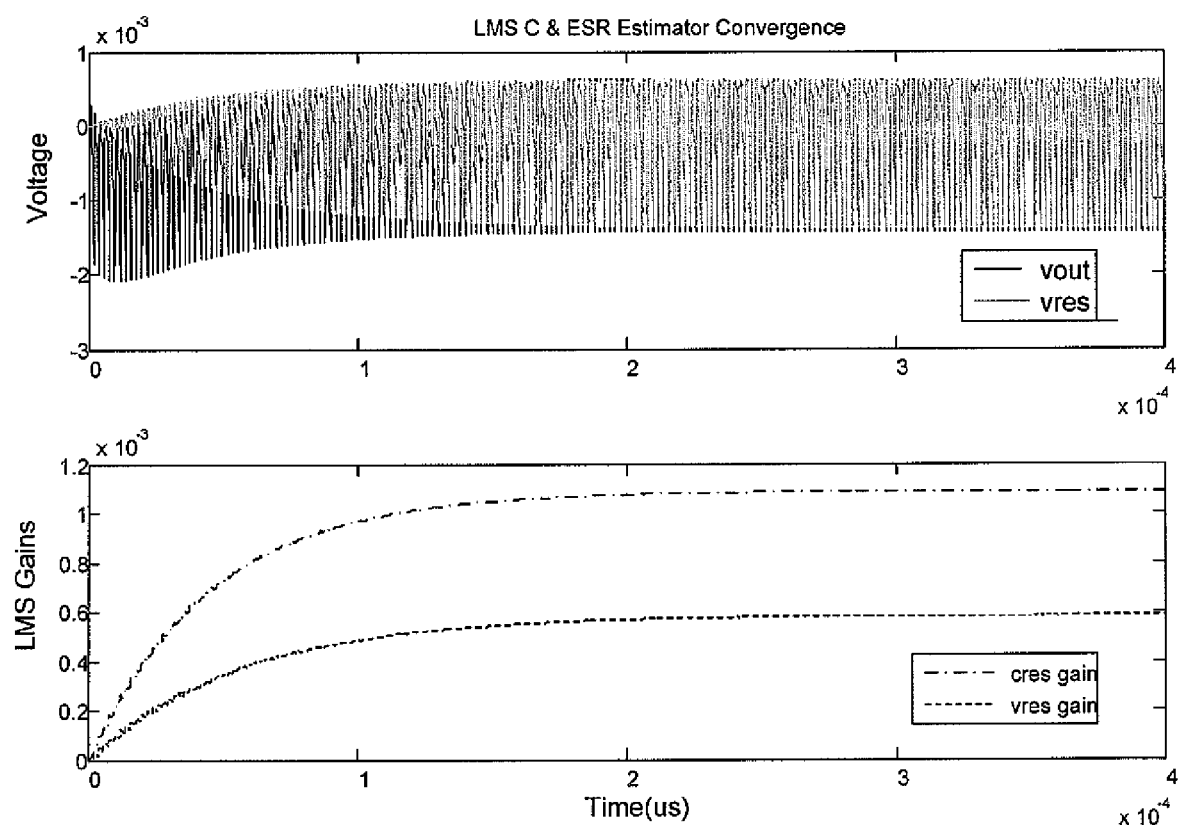
FIG. 7 is a graph of the results from an exemplary embodiment of the LMS algorithm implementation of FIG. 5 of the present teachings.
Figure 8:
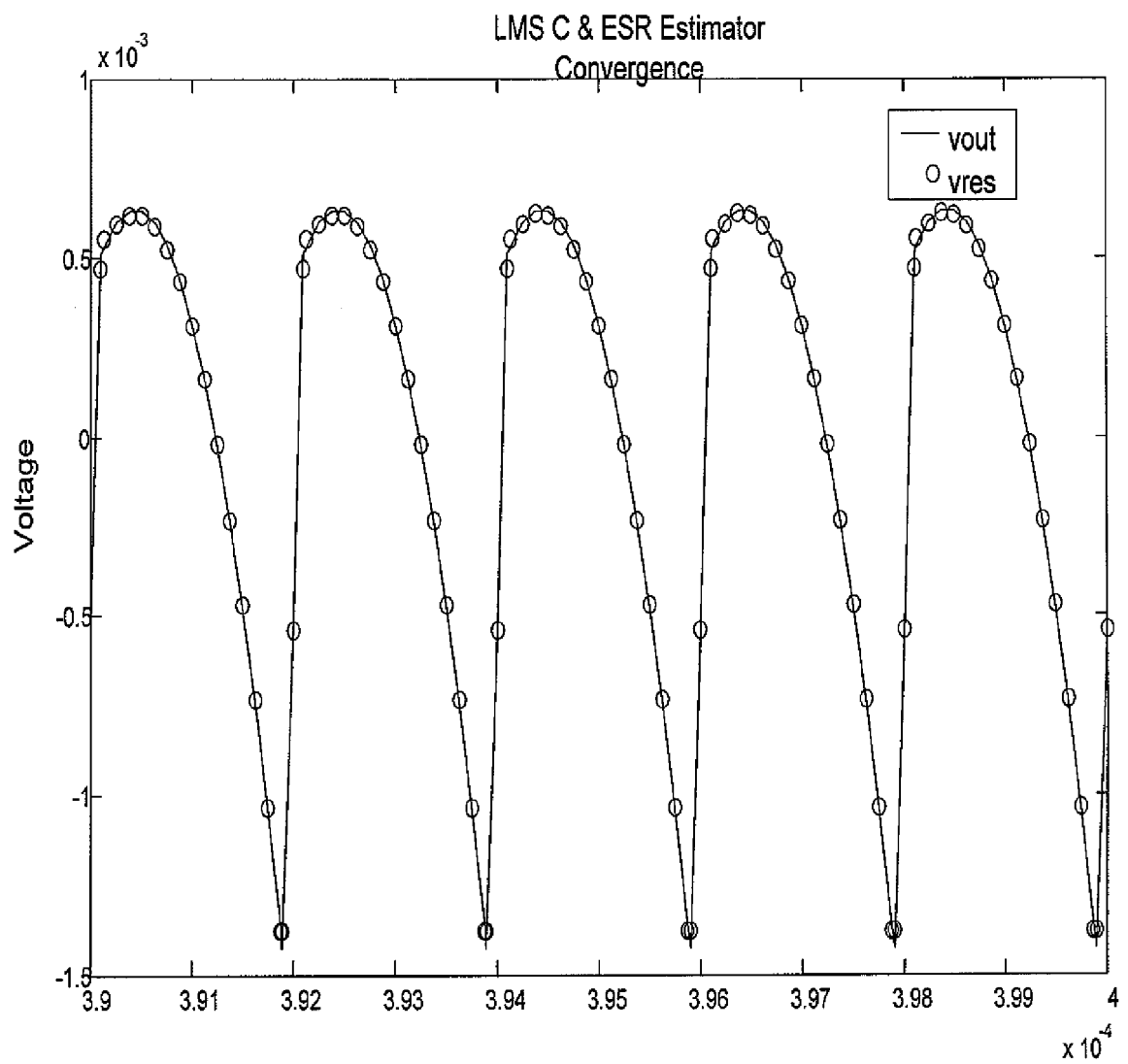
FIG. 8 is a graph the converged results from an exemplary embodiment of the LMS algorithm implementation of FIG. 5.

Referring now to FIG. 7, exemplary results of the LMS algorithm of FIG. 5 are shown. In this exemplary embodiment, an oversampling ratio of eight is used. It can be seen that the convergence of both gains have similar time constants. In FIG. 8 the converged result is shown.

Figure 9:
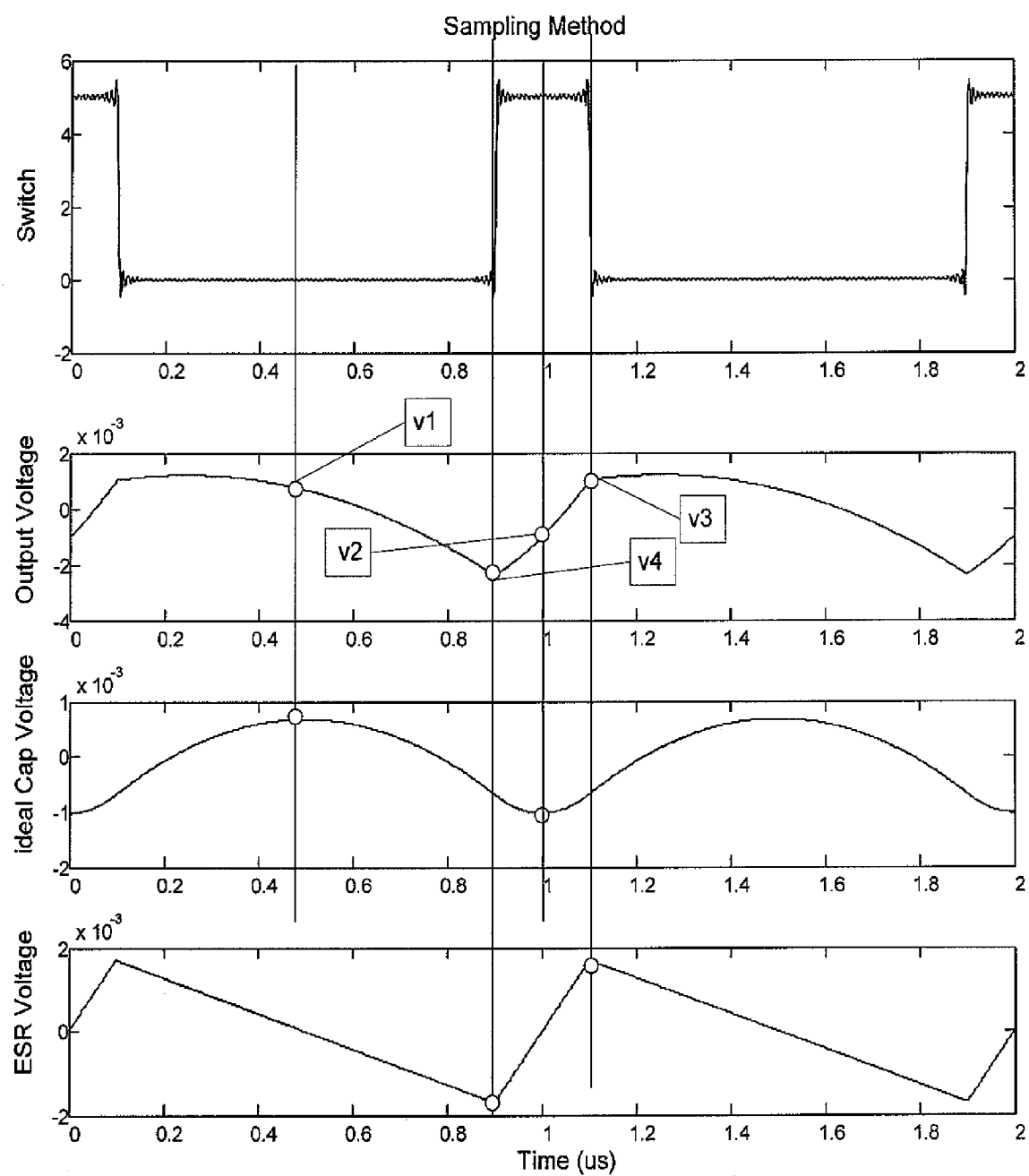
FIG. 9 is a graph of the sampling times and their corresponding points on the basis waveforms of an exemplary embodiment of the present teachings.

Referring now to FIG. 9. a third embodiment of the method of these teachings includes sampling the output waveform at four points. In one instance these points are the: center of the PWM cycle v1, center of the PWM off Time v2, rising edge v4 of the switched signal and following edge v3 of the switch signal. The first two values represent the maximum and minimum capacitor voltage and the second two values represent the minimum and maximum ESR voltage. These can be compared to the individual basis functions and the relative scaling can be determined. Sampling times and their corresponding points on the basis waveforms are shown.

$$wvcap = \frac{v1 - v2}{\max(vcap)}$$

$$wvres = \frac{v3 - v4}{\max(vres)}$$

Figure 10:
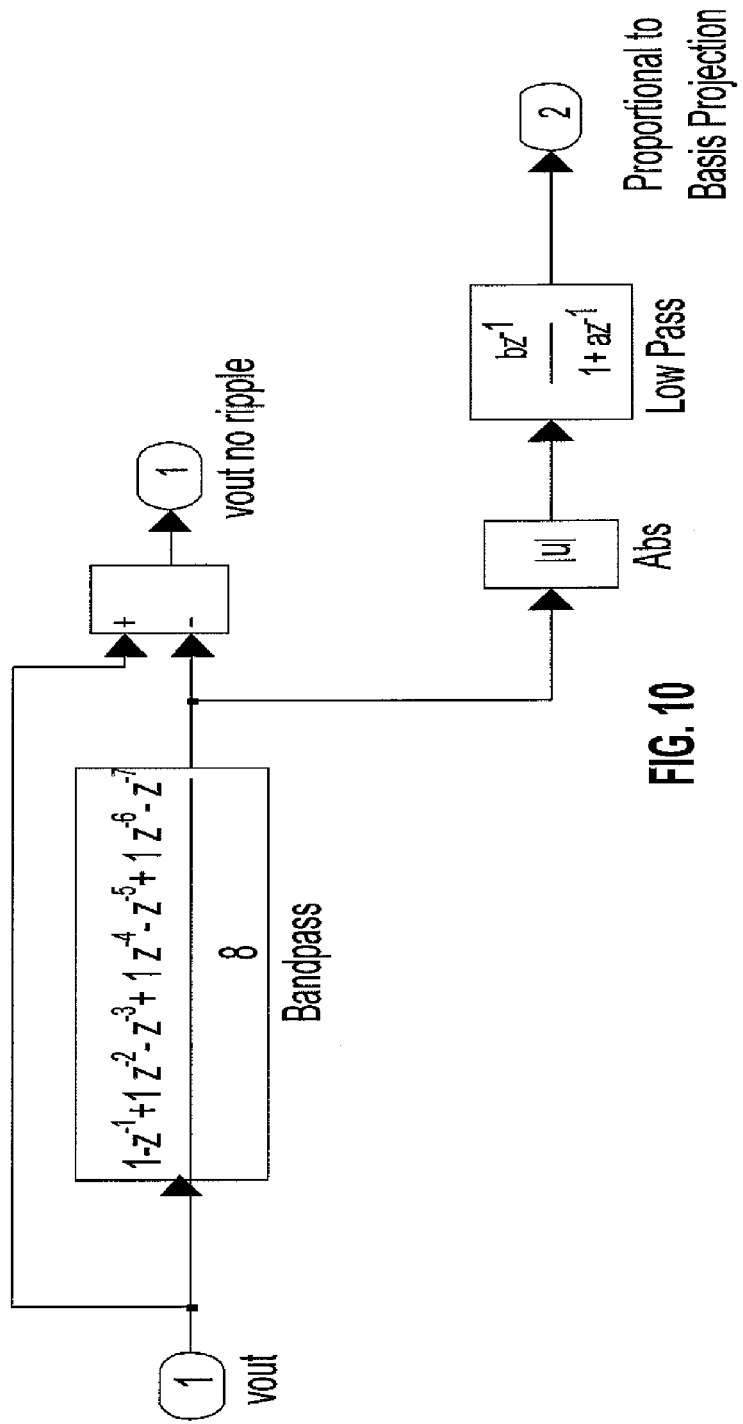
FIG. 10 is a schematic diagram of the bandpass filter of an exemplary embodiment of the present teachings.

The differences between v1 and v2 or v3 and v4 can be determined by using a band pass filter. The output of the band pass filter can be rectified and used as a measure of the signal level. In the case of v3 and v4 the sampling rate is not uniform and is duty cycle dependent. The band pass filter can be event driven on the sampling instance. The bandpass filter can be seen in FIG. 10.

Referring again primarily to FIG. 1b, the method of the present teachings for estimating a system parameter for power supply/converter 100 having driver component 25 receiving duty cycle command 43 can include, but is not limited to including, the steps of decomposing a ripple voltage associated with power supply/converter 100 into constituents, and determining basis functions for power supply/converter 100 based on a nominal network. The basis functions can include values. The method can further include the steps of computing a scale factor by correlating the constituents to the values, and estimating the system parameter based on the scale The basis functions can include, for example, an ideal capacitor basis function, an equivalent series resistance (ESR) basis function, and an equivalent series inductance (ESL) basis function. The constituents can include, for example, voltage across ESL, voltage across the ESR, and voltage across the ideal capacitor. The system parameter can include capacitance and ESR.

The step of determining the ideal capacitor basis function and the equivalent series resistance (ESR) basis function can include, but is not limited to including the step of integrating, two times, a switch waveform with an AC coupling, the switch waveform associated with power supply/converter 100.

Referring again to FIG. 5, the method can optionally include the step of accessing the values by the steps of storing the values in table 33, and selecting one of the values based on time index 37 of a signal from the driver component 25 and duty cycle 35.

In another embodiment, and referring again primarily to FIG. 1b, the method for estimating a system parameter for power supply/converter 100 can include, but is not limited to including, the steps of decomposing a ripple voltage into constituents, summing an ideal capacitor voltage basis function and an ESR voltage basis function for power supply/converter 100 based on a nominal network, scaling the sum, computing a scale factor by applying a least mean squares (LMS) algorithm to an output voltage of power supply/converter 100 and the scaled sum, and estimating the system parameter based on the scale factor. The method can optionally include the steps of extracting the ripple voltage from the at least one system parameter, and predicting an ideal system parameter based on the step of extracting.

In yet another embodiment, and referring to FIGS. 1b, 5, and 9, the method for estimating a system parameter for power supply/converter 100 (FIG. 1b) can include, but is not limited to including, the steps of determining an ideal capacitor basis function and an ESR basis function for power supply/converter 100 (FIG. 1b) based on a nominal network, sampling an output waveform from the power supply/converter 100 (FIG. 1b) to determine minima and maxima of a capacitor voltage and an ESR voltage, comparing the minima and maxima to the ideal capacitor basis function and the ESR basis function, determining a scale factor based on the step of comparing, and estimating the system parameter based on the scale factor. The point to sample from the output waveform can be pulse width modulation (PWM) cycle center v1 (FIG. 9), PWM off Time center v2 (FIG. 9), rising edge v4 (FIG. 9) of a switched signal, and following edge v3 (FIG. 9) of the switched signal.

Although these teachings has been described with respect to various embodiments, it should be realized these teachings is also capable of a wide variety of further and other embodiments within the spirit and scope of these teachings.

What is claimed is:

1. A method for estimating at least one system parameter for a power supply having a driver component receiving a duty cycle command, the method comprising:
   decomposing a ripple voltage associated with the power supply into constituents;
   determining, using a basis function generator, at least two basis functions for the power supply based on a nominal network, the at least two basis functions including values;
   computing, using a correlator, at least one scale factor by correlating the constituents to the values; and
   estimating, using an estimator, the at least one system parameter based on the at least one scale factor.

2. The method of claim 1 wherein the at least two basis functions comprise an ideal capacitor basis function and an equivalent series resistance (ESR) basis function.

3. The method of claim 2 wherein the constituents comprise a voltage across the ESR and a voltage across the ideal capacitor.

4. The method of claim 1 wherein the at least two basis functions comprise an ideal capacitor basis function, an equivalent series resistance (ESR) basis function, and an equivalent series inductance (ESL) basis function.

5. The method of claim 4 wherein the constituents comprise a voltage across the ESL, a voltage across the ESR, and a voltage across the ideal capacitor.

6. The method of claim 1 further comprising:
   selecting the at least one system parameter from the group consisting of a capacitance and an equivalent series resistance (ESR).

7. The method of claim 1 further comprising:
   accessing the values by:
     storing the values in a table; and
     selecting one of the values based on a time index of a signal from the driver component and the duty cycle.

8. The method of claim 2 wherein determining the ideal capacitor basis function and the equivalent series resistance (ESR) basis function comprises:
   integrating, two times, a switch waveform with an AC coupling, the switch waveform associated with the power supply.

9. A method for estimating at least one system parameter for a power supply comprising:
   decomposing a ripple voltage of the power supply into constituents, wherein the constituents comprise a voltage across an ideal capacitor and a voltage across an equivalent series resistance (ESR);
   determining, using a basis function generator, an ideal capacitor voltage basis function and an ESR voltage basis function for the power supply based on a nominal network;
   summing the ideal capacitor voltage basis function and the ESR voltage basis function for the power supply;
   scaling the sum;
   computing a scale factor by applying a least mean squares (LMS) algorithm to an output voltage of the power supply and the scaled sum; and
   estimating, using an estimator, the at least one system parameter based on the scale factor.

10. The method of claim 9 further comprising:
    extracting the ripple voltage from the at least one system parameter; and
    predicting an ideal system parameter based on the extracting.

11. A method for estimating at least one system parameter for a power supply comprising:
- determining, using a basis function generator, an ideal capacitor basis function and an equivalent series resistance (ESR) basis function for the power supply based on a nominal network;
- sampling an output waveform from the power supply to determine minima and maxima of a capacitor voltage and an ESR voltage;
- comparing the minima and maxima to the ideal capacitor basis function and the ESR basis function;
- determining at least one scale factor based on the comparing; and
- estimating, using an estimator, the at least one system parameter based on the at least one scale factor.

12. The method of claim 11 wherein the sampling the output waveform comprises:
- selecting at least one point to sample from the output waveform from the group consisting of a center of a pulse width modulation (PWM) cycle, a center of a PWM off Time, a rising edge of a switched signal, and an edge following the rising edge of the switched signal.

13. A power supply comprising:
- a circuit providing an output voltage, circuit including a ripple voltage, the ripple voltage having constituents;
- at least one switching component, the at least one switching component operatively connected to switch the circuit between at least two switching states;
- a driver component operatively connected to drive the at least one switching component to cause switching between two of the at least two switching states, the driver component having a period;
- a compensator component operatively connected to receive an input control signal and estimates of at least one system parameter for the power supply, and to provide a duty cycle command based on the input control signal and the estimates to the driver component;
- a basis function generator providing at least two basis functions for the power supply based on a nominal network for the power supply, the at least two basis functions including values;
- at least one correlator correlating the values with the constituents to compute at least one scale factor; and
- an estimator providing the estimates to the compensator based on the at least one scale factor.

14. The power supply claim 13 wherein the at least one correlator is a digital correlator, the digital correlator being synchronous with the period.

15. The power supply claim 13 wherein the at least one correlator is an analog correlator, the analog correlator being synchronous with the period.

16. The power supply claim 13 wherein the at least two basis functions comprise an ideal capacitor basis function and an equivalent series resistance (ESR) basis function.

17. The power supply claim 13 wherein the constituents comprise a voltage across an equivalent series resistance (ESR) and a voltage across an ideal capacitor.

18. The power supply claim 13 wherein the at least two basis functions comprise an ideal capacitor basis function, an equivalent series resistance (ESR) basis function, and an equivalent series inductance (ESL) basis function.

19. The power supply claim 18 wherein the constituents comprise a voltage across ESL, a voltage across the ESR, and a voltage across the ideal capacitor.

20. The power supply claim 13 wherein the at least one system parameter is selected from the group consisting of a capacitance and an equivalent series resistance (ESR).

21. The power supply claim 13 wherein the basis function generator comprises:
- a table storing the values; and
- a selection component selecting one of the values based on a time index of a signal from the driver component and the duty cycle.

22. The power supply claim 13 wherein the basis function generator comprises:
- a switch waveform associated with the power supply; and
- an integrator integrating, two times, the switch waveform with an AC coupling.

* * * * *

UNITED STATES PATENT AND TRADEMARK OFFICE
CERTIFICATE OF CORRECTION

PATENT NO. : 8,253,402 B2  
APPLICATION NO. : 12/622500  
DATED : August 28, 2012  
INVENTOR(S) : Stewart Kenly et al.

Page 1 of 1

It is certified that error appears in the above-identified patent and that said Letters Patent is hereby corrected as shown below:

In the Specifications:

| | |
|---|---|
| Column 3, Line 18 | After "graph", insert --of-- |
| Column 4, Line 15 | Delete "then" and insert --than-- |
| Column 4, Line 40 | Delete "i=1" and insert --k=1-- |
| Column 4, Line 49 | Delete "2" and insert --w-- |
| Column 4, Line 50 | Delete "Tpwn$^2$" and insert --Tpwm$^2$-- |
| Column 4, Line 60 | Delete "Tpwn" and insert --Tpwm-- |
| Column 7, Line 64 | Delete "has" and insert --have-- |
| Column 7, Line 66 | Delete "is" and insert --are-- |

In the Claims:

| | |
|---|---|
| Column 10, Line 5, Claim 14 | After "supply", insert --of-- |
| Column 10, Line 8, Claim 15 | After "supply", insert --of-- |
| Column 10, Line 11, Claim 16 | After "supply", insert --of-- |
| Column 10, Line 14, Claim 17 | After "supply", insert --of-- |
| Column 10, Line 17, Claim 18 | After "supply", insert --of-- |
| Column 10, Line 21, Claim 19 | After "supply", insert --of-- |
| Column 10, Line 24, Claim 20 | After "supply", insert --of-- |
| Column 10, Line 27, Claim 21 | After "supply", insert --of-- |
| Column 10, Line 33, Claim 22 | After "supply", insert --of-- |

Signed and Sealed this  
Second Day of July, 2013

Teresa Stanek Rea  
*Acting Director of the United States Patent and Trademark Office*